(12) United States Patent
Sugiyama (10) Patent No.: US 11,829,820 B2
(45) Date of Patent: Nov. 28, 2023

(54) COLORIMETRIC METHOD, COLORIMETRIC SYSTEM, AND SERVER

(71) Applicant: Seiko Epson Corporation, Tokyo (JP)

(72) Inventor: Yuichi Sugiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/650,396

(22) Filed: Feb. 9, 2022

(65) Prior Publication Data
US 2022/0269913 A1    Aug. 25, 2022

(30) Foreign Application Priority Data

Feb. 12, 2021  (JP) ................... 2021-021197

(51) Int. Cl.
*H04N 1/60* (2006.01)
*G06K 15/02* (2006.01)
*G06K 15/12* (2006.01)

(52) U.S. Cl.
CPC ....... *G06K 15/1806* (2013.01); *G06K 15/129* (2013.01); *H04N 1/6019* (2013.01)

(58) Field of Classification Search
CPC . G06K 15/1806; G06K 15/129; H04N 1/6019
See application file for complete search history.

(56) References Cited

U.S. PATENT DOCUMENTS

| | | | |
|---|---|---|---|
| 9,749,500 B2 | 8/2017 | Tsuji | |
| 2005/0264640 A1* | 12/2005 | Kitazawa | ............ H04N 1/6055 347/171 |
| 2007/0229870 A1* | 10/2007 | Doi | ...................... H04N 1/6033 358/1.9 |
| 2011/0058198 A1* | 3/2011 | Teraue | ................. H04N 1/6033 358/1.9 |
| 2011/0069333 A1* | 3/2011 | Katayama | ............ H04N 1/6055 358/1.9 |

(Continued)

FOREIGN PATENT DOCUMENTS

| | | | |
|---|---|---|---|
| CN | 105939438 | 9/2016 | |
| EP | 2306700 A2 * | 4/2011 | ........... H04N 1/6033 |

(Continued)

*Primary Examiner* — Ted W Barnes
(74) *Attorney, Agent, or Firm* — WORKMAN NYDEGGER (57) ABSTRACT

A colorimetric method is executed by a server that communicates with an information processing apparatus coupled to a printing apparatus and to a colorimetric device. The method includes: creating work information that includes print commanding information related to a command to print a chart image based on chart information and also includes colorimetry commanding information related to a command to perform colorimetry for the chart image; storing the work information; transmitting the print commanding information to the information processing apparatus; causing the information processing apparatus to command, according to the print commanding information, the printing apparatus to print the chart image; transmitting the colorimetry commanding information to the information processing apparatus; and acquiring colorimetry result information created as a result of the colorimetry performed for the chart image by the colorimetric device.

10 Claims, 5 Drawing Sheets

(56) References Cited

U.S. PATENT DOCUMENTS

| | | | |
|---|---|---|---|
| 2011/0075223 A1* | 3/2011 | Katayama | H04N 1/6088 |
| | | | 358/3.23 |
| 2012/0050770 A1* | 3/2012 | Katayama | H04N 1/6033 |
| | | | 358/1.9 |
| 2012/0075645 A1* | 3/2012 | Katayama | H04N 1/6055 |
| | | | 358/1.9 |
| 2012/0081722 A1* | 4/2012 | Katayama | G06K 15/1878 |
| | | | 358/1.9 |
| 2014/0198328 A1* | 7/2014 | Katayama | G06K 15/027 |
| | | | 358/1.9 |
| 2015/0358506 A1* | 12/2015 | Hirano | H04N 1/6033 |
| | | | 358/1.9 |
| 2016/0261773 A1 | 9/2016 | Tsuji | |
| 2017/0054877 A1* | 2/2017 | Shibata | H04N 1/00058 |
| 2017/0208217 A1* | 7/2017 | Soriano | H04N 1/00061 |
| 2019/0095147 A1* | 3/2019 | Yano | H04N 1/6044 |
| 2019/0260911 A1* | 8/2019 | Toriyabe | H04N 1/6008 |
| 2020/0136886 A1* | 4/2020 | Tanimura | G01J 3/027 |
| 2021/0294552 A1* | 9/2021 | Fujita | G06F 3/1255 |
| 2022/0019389 A1* | 1/2022 | Maeda | G06F 3/1272 |
| 2022/0114408 A1* | 4/2022 | Shindo | G06K 15/027 |
| 2022/0272233 A1* | 8/2022 | Nagai | H04N 1/6033 |

FOREIGN PATENT DOCUMENTS

| | | | | |
|---|---|---|---|---|
| EP | 2434745 A2 * | 3/2012 | | G01J 3/52 |
| JP | 2020-071083 | 5/2020 | | |

* cited by examiner

COLORIMETRIC METHOD, COLORIMETRIC SYSTEM, AND SERVER

The present application is based on, and claims priority from JP Application Serial Number 2021-021197, filed Feb. 12, 2021, the disclosure of which is hereby incorporated by reference herein in its entirety.

BACKGROUND

1. Technical Field

The present disclosure relates to a colorimetric method, a colorimetric system, and a server.

2. Related Art

In a printing apparatus that performs printing by an ink jet method, an electrophotographic method, or the like, color matching is generally performed to make a color of an image to be printed approach a desired color. In this color matching, colorimetry disclosed in, for example, JP-A-2020-71083 is performed.

With this method, the degree of freedom in time taken by the user in colorimetric work is low. In addition, the user needs to be familiarized with all processes required in colorimetric work alone to a certain extent. Thus, the colorimetric method in related art lacks usability.

SUMMARY

A colorimetric method according to one aspect of the present disclosure is executed by a server that communicates with an information processing apparatus coupled to a printing apparatus and to a colorimetric device. The method includes: creating work information that includes print commanding information related to a command to print a chart image based on chart information and also includes colorimetry commanding information related to a command to perform colorimetry for the chart image; storing the work information; transmitting the print commanding information to the information processing apparatus; causing the information processing apparatus to command, according to the print commanding information, the printing apparatus to print the chart image; transmitting the colorimetry commanding information to the information processing apparatus; and acquiring colorimetry result information created as a result of the colorimetry performed for the chart image by the colorimetric device.

A colorimetric system according to one aspect of the present disclosure has a server, an information processing apparatus, a colorimetric device, and a printing apparatus. The server has: a first processing portion that creates work information that includes print commanding information related to a command to print a chart image based on chart information and also includes colorimetry commanding information related to a command to perform colorimetry for the chart image; a storage portion that stores the work information; and a first communication portion that transmits the print commanding information to the information processing apparatus. The information processing apparatus has: a second communication portion that receives the print commanding information from the server; a second processing portion that causes, according to the print commanding information, the printing apparatus to print the chart image; and a third processing portion that acquires, from the colorimetric device, colorimetry result information created as a result of the colorimetry performed for the chart image by the colorimetric device.

A colorimetric system according to one aspect of the present disclosure has a server, a colorimetric device, and a printing apparatus. The server has: a processing portion that creates work information that includes print commanding information related to a command to print a chart image based on chart information and also includes colorimetry commanding information related to a command to perform colorimetry for the chart image, the colorimetry commanding information being made to correspond to the print commanding information; a storage portion that stores the work information; and a communication portion that transmits the print commanding information and the colorimetry commanding information at different times. The printing apparatus prints the chart image according to the print commanding information. The colorimetric device performs colorimetry for the chart image according to the colorimetry commanding information. The server makes a correspondence between the print commanding information and the colorimetry commanding information.

A server according to one aspect of the present disclosure communicates with an information processing apparatus. The server has: a processing portion that creates work information that includes print commanding information related to a command to print a chart image based on chart information and also includes colorimetry commanding information related to a command to perform colorimetry for the chart image; a storage portion that stores the work information; and a communication portion that transmits the print commanding information and the colorimetry commanding information to the information processing apparatus at different times.

DESCRIPTION OF EXEMPLARY EMBODIMENTS

A preferred embodiment of the present disclosure will be described below with reference to the drawings. The dimensions and scales of individual portions in the drawings differ from their actual dimensions and scales, as appropriate. The drawings may be schematic for easy understanding. The scope of the present disclosure is not limited to forms exemplified below unless there is a particular description that limits the present disclosure.

1. Embodiment 1-1. Colorimetric System

Figure 1:
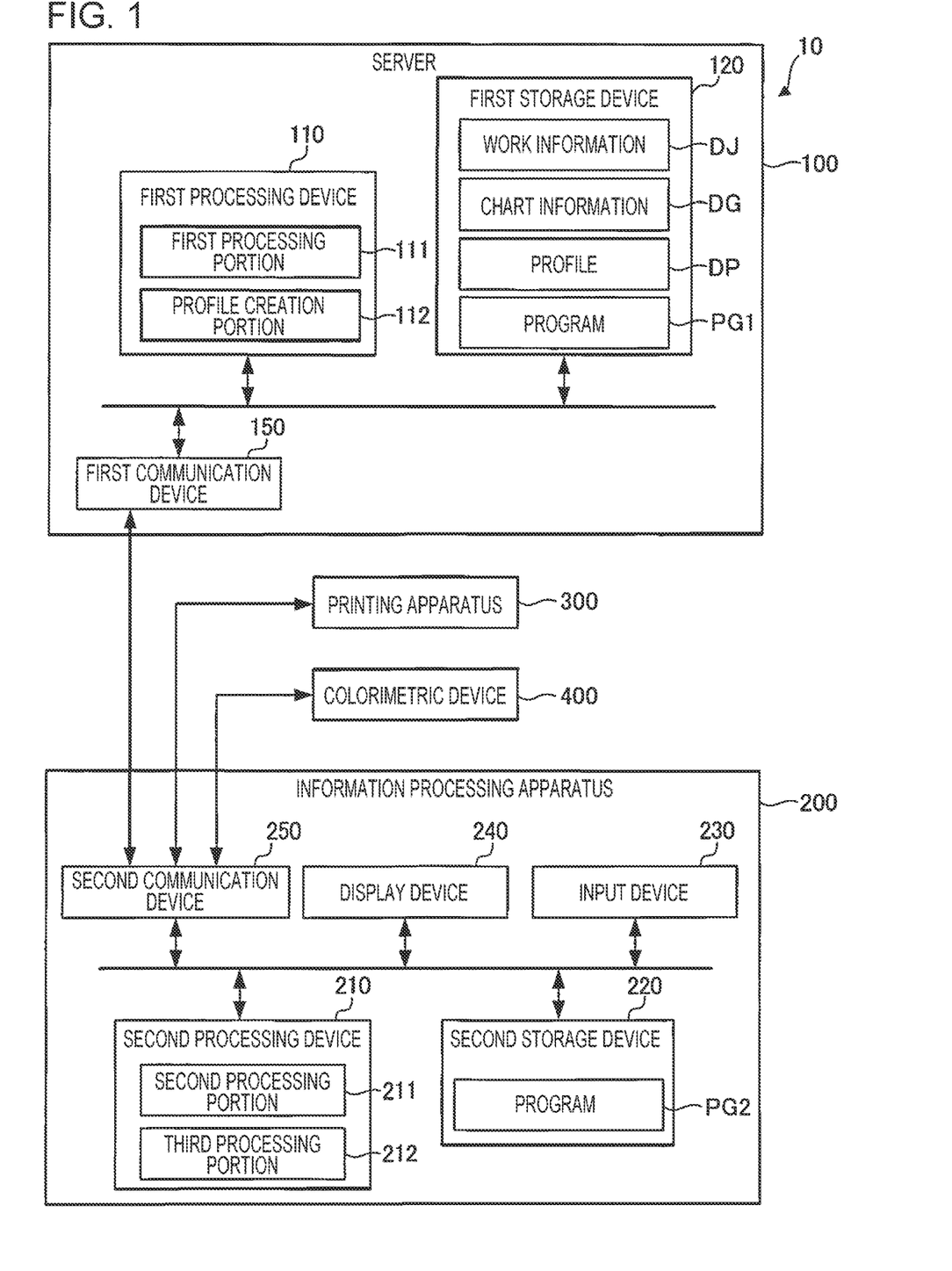
FIG. 1 illustrates an example of the structure of a colorimetric system according to an embodiment.

FIG. 1 illustrates an example of a colorimetric system 10 according to an embodiment of the present disclosure. The colorimetric system 10 causes a printing apparatus 300 to execute printing based on work information DJ created by a server 100. The colorimetric system 10 also causes a colorimetric device 400 to perform colorimetry based on the work information DJ. Besides the printing and colorimetry, the colorimetric system 10 in this embodiment also causes the server 100 to create a profile DP according to the result of the colorimetry.

The work information DJ includes print commanding information and colorimetry commanding information. The print commanding information, which is an execution command related to printing by the printing apparatus 300 described later, includes information related to an execution command for the printing. The colorimetry commanding information, which is an execution command related to colorimetry by the colorimetric device 400 described later, includes information related to an execution command for the colorimetry and to measurement conditions. The work information DJ is created by a first processing portion 111 described later. The server 100 stores the print commanding information and colorimetry commanding information in a first storage device 120 in correspondence to each other through information related to a job ID described later.

The profile DP is created by a profile creation portion 112 described later. The profile DP, which is, for example, an input profile, includes a conversion table that performs conversion by taking a color value in a color space as an input value and also taking a color value in another color space as an output value. Although there is no particular limitation on the format of the profile DP, it complies with, for example, the stipulation in the International Color Consortium (ICC).

The colorimetric system 10 has the server 100, an information processing apparatus 200, the printing apparatus 300, and the colorimetric device 400. The server 100 and information processing apparatus 200 are coupled to each other so that communication is possible. Coupling between the server 100 and the information processing apparatus 200 may be wireless coupling or may be wired coupling. A network NW such as the Internet or a local area network (LAN) may be present between the server 100 and the information processing apparatus 200.

The server 100 is a computer that creates work information DJ. Specifically, the server 100 has a function that accepts an input of information required to create work information DJ, a function that creates the work information DJ, a function that stores the work information DJ, and a function that transmits the work information DJ to the information processing apparatus 200. The server 100 is typically a cloud server. However, the server 100 may be a server other than a cloud server.

The server 100 has a first processing device 110, a first storage device 120, and a first communication device 150, as illustrated in FIG. 1. The first storage device 120 is an example of a storage portion. The first communication device 150 is an example of a communication portion and also an example of a first communication portion.

The first processing device 110 has a function that controls individual portions in the server 100 and also has a function that processes various types of data. The first processing device 110 includes a processor such as, for example, a central processing unit (CPU). The first processing device 110 may be composed of a single processor or a plurality of processors. Part or all of the functions of the first processing device 110 may be implemented by hardware such as a digital signal processor (DSP), an application-specific integrated circuit (ASIC), a programmable logic device (PLD), or a field programmable gate array (FPGA).

The first storage device 120 stores programs, which includes a program PG1, to be executed by the first processing device 110, and also stores various types of data to be processed by the first processing device 110. The first storage device 120 includes, for example, a hard disk drive or a semiconductor memory. Part or the whole of the first storage device 120 may be disposed in an external storage device of the server 100, a terminal apparatus, or the like. The first storage device 120 in this embodiment stores work information DJ, chart information DG, the profile DP, and the program PG1, as illustrated in FIG. 1.

Chart information DG is, for example, image information that represents a chart image of a chart used for colorimetry. The chart information DG includes image information related to a job ID that identifies work information DJ. The job ID is an example of an identifier.

Image information related to a job ID is, for example, code information. The image information is related to an image to be added to a chart image. The code information is typically a two-dimensional code such as Quick Response (QR) Code (QR Code is a registered trademark). However, this is not a limitation. The code information may be a one-dimensional code such as, for example, a bar code.

The first communication device 150 is a communication circuit coupled to a second communication device described later so that communication is possible with second communication device 250 described later. The first communication device 150 includes interfaces such as for, for example, universal serial bus (USB) coupling and LAN coupling. The first communication device 150 transmits print commanding information and colorimetry commanding information to the information processing apparatus 200 at different times. The different times indicates that, for example, there is a difference between a time at which the first communication device 150 starts transmission of print commanding information and a time at which the first communication device 150 starts transmission of colorimetry commanding information.

In the server 100 described above, the first processing device 110 reads the program PG1 from the first storage device 120 and executes the program PG1. When the first processing device 110 executes the program PG1, the first processing device 110 functions as the first processing portion 111 and profile creation portion 112.

The first processing portion 111 accepts, from the information processing apparatus 200, information required to create work information DJ, the information being entered in response to, for example, a manipulation by a manipulator on an input device 230 described later, after which the first processing portion 111 creates work information DJ according to the information. The first processing portion 111 stores the created work information DJ in the first storage device 120 and then causes the first communication device 150 to perform processing to transmits the work information DJ. The first processing portion 111 is an example of a processing portion.

The profile creation portion 112 creates a profile DP according to the result of colorimetry by the colorimetric device 400. The result of colorimetry by the colorimetric device 400 is entered from the colorimetric device 400 into the server 100 through the information processing apparatus 200.

The information processing apparatus 200 is typically a computer such as a personal computer (PC). However, this is not a limitation. The information processing apparatus 200 may be an information terminal such as, for example, a smart phone or a tablet terminal. The information processing apparatus 200 has a second processing device 210, a second storage device 220, the above-mentioned input device 230, a display device 240, and the second communication device 250, as illustrated in FIG. 1. The second communication device 250 is an example of a second communication portion.

The second processing device 210 has a function that controls individual portions in the information processing apparatus 200 and also has a function that processes various types of data. The second processing device 210 includes a processor such as a CPU. The second processing device 210 may be composed of a single processor or a plurality of processors. Part or all of the functions of the second processing device 210 may be implemented by hardware such as a DSP, an ASIC, a PLD, or an FPGA.

The second storage device 220 stores programs, which includes a program PG2, to be executed by the second processing device 210, and also stores various types of data to be processed by the second processing device 210. The second storage device 220 includes, for example, a hard disk drive or a semiconductor memory. Part or the whole of the second storage device 220 may be disposed in an external storage device of the information processing apparatus 200, a terminal apparatus, or the like.

The input device 230 is a unit that accepts a manipulation performed by the manipulator of the information processing apparatus 200. In this embodiment, in response to a manipulation on the input device 230, the manipulator of the information processing apparatus 200 enters information required to create work information DJ into the server 100 through the second communication device 250. The input device 230 includes, for example, a touch panel, a touch pad, or a pointing device such as a mouse.

The display device 240 provides a display under control of the second processing device 210. Specifically, the display device 240 displays an image that assists input of information required to create work information DJ or displays an image indicating a progress status in colorimetry based on work information DJ, for example. The display device 240 is composed of, for example, a liquid crystal display panel, an organic electro-luminescence (EL) display panel, or any of various other display panels. The display device 240 may be disposed outside the information processing apparatus 200.

The second communication device 250 is a communication circuit coupled to the first communication device 150, printing apparatus 300, and colorimetric device 400 so that communication is possible. The second communication device 250 includes interfaces such as for, for example, USB coupling and LAN coupling. The second communication device 250 may be wirelessly coupled to the first communication device 150, printing apparatus 300, and colorimetric device 400 by, for example, Wireless Fidelity (Wi-Fi) or Bluetooth (Wi-Fi and Bluetooth are each a registered trademark), or may be coupled to the first communication device 150, printing apparatus 300, and colorimetric device 400 through a LAN or the Internet.

In the information processing apparatus 200 described above, the second processing device 210 reads the program PG2 from the second storage device 220 and executes the program PG2. When the second processing device 210 executes the program PG2, the second processing device 210 functions as a second processing portion 211 and a third processing portion 212. The program PG2 may be composed of two separate programs, one of which implements the second processing portion 211 and the other of which implements the third processing portion 212.

The second processing portion 211 accepts print commanding information included in work information DJ from the server 100. The second processing portion 211 causes the second communication device 250 to processing to transmit the print commanding information to the printing apparatus 300. The third processing portion 212 accepts colorimetry commanding information included in work information DJ from the server 100. The third processing portion 212 causes the second communication device 250 to execute processing to transmit the colorimetry commanding information to the colorimetric device 400.

The printing apparatus 300 performs printing on a print medium under control of the server 100. Specifically, the printing apparatus 300 prints, on a print medium, a chart image based on chart information DG entered from the server 100 through the second communication device 250.

There is no particular limitation on the print medium. The print medium is, for example, any of various pieces of paper, various cloths, and various films. There is also no particular limitation on the method of printing by the printing apparatus 300. For example, an ink jet method, an electrophotographic method, or the like can be used. Although not illustrated, the printing apparatus 300 has, for example, a printer engine that uses an ink jet method, an electrophotographic method, or the like, a transport mechanism that transports a print medium in a predetermined direction, and a control circuit that controls the driving of the printer engine and transport mechanism according to, for example, information from the server 100.

The printing apparatus 300 described above executes printing by, for example, using a color material such as ink or toner in a plurality of colors. As the plurality of colors, process colors such as, for example, cyan, magenta, yellow, and black, are used. The plurality of colors may include fluorescent colors, metal colors, and other special colors. There is no particular limitation on the number of colors of the color material. Any number of colors can be used.

The colorimetric device 400 is a camera, a scanner, or another device that images a target in colorimetry. When the colorimetric device 400 images the target, imaging information representing an image obtained by imaging the target is created as colorimetry result information. In this embodiment, the target is the print surface, of a predetermined print medium, on which predetermined colors in chart information DG are printed.

Although not illustrated, the colorimetric device 400 has a colorimetric mechanism. The colorimetric mechanism is an assembly having an imaging optics and an imaging device. The imaging optics, which includes at least one imaging lens, may include various optical devices such as a prism and may also include a zoom lens, a focus lens, and the like. The imaging device is, for example, a charge coupled device (CCD) image sensor or a complementary metal-oxide-semiconductor (CMOS) image sensor. Besides the imaging optics and imaging device, the colorimetric mechanism may also include a movement mechanism that changes a positional relationship between an imaging range and the target to be imaged, as necessary.

The colorimetric mechanism in this embodiment may have a spectroscopic function. In this case, a diffraction grating, a tunable filter, and the like, for example, are provided in the imaging optics. An image imaged by the colorimetric mechanism may be a full-color image or a mono-color image. When the image obtained by imaging is a full-color image, imaging information represented by tristimulus values in an XYZ color system is obtained for each pixel in the image obtained by imaging as a result in colorimetry by the colorimetric device 400, for example. When the image obtained by imaging is a mono-color image, imaging information represented by a brightness value is obtained for each pixel in the image obtained by imaging as a result in colorimetry by the colorimetric device 400. However, the image obtained by imaging is preferably a full-color image.

1-2. Setting in Coupling

Figure 2:
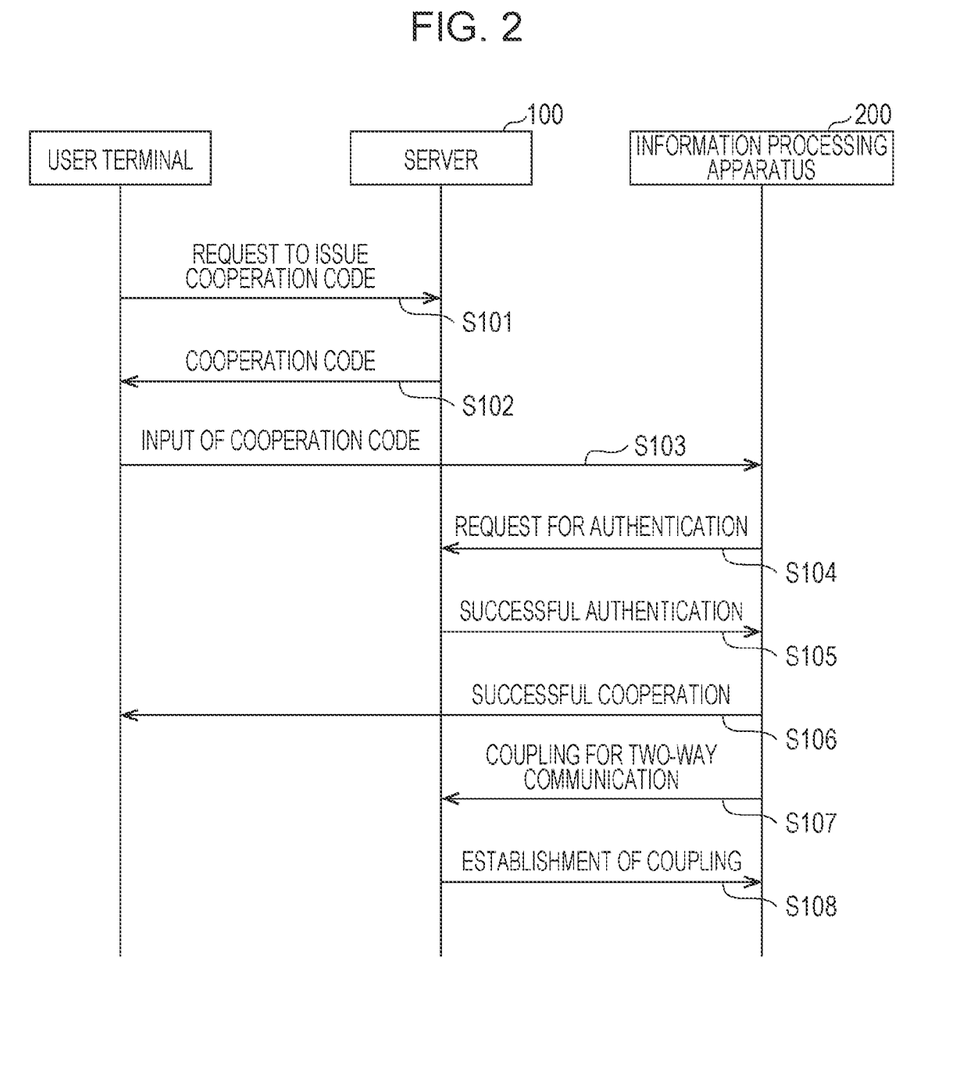
FIG. 2 illustrates a procedure for setting coupling between a server and an information processing apparatus.

FIG. 2 illustrates a procedure for setting coupling between the server 100 and the information processing apparatus 200. In the colorimetric system 10 in this embodiment, coupling between the server 100 and the information processing apparatus 200 is set before the printing apparatus 300 prints a chart image and the colorimetric device 400 performs colorimetry for the chart image.

In step S101, the terminal apparatus manipulated by the user requests the server 100 to issue a cooperation code used for cooperation between the server 100 and the information processing apparatus 200. The terminal apparatus is, for example, a PC, a smart phone, a tablet terminal, or another communication terminal. In the description below, the terminal apparatus manipulated by the user will be referred to as the user terminal. Next, the server 100 notifies the user terminal of a cooperation code in step S102, after which the user enters the cooperation code into the information processing apparatus 200 in step S103.

Next, the information processing apparatus 200 transmits, to the server 100, a notification that requests authentication of coupling between the server 100 and the information processing apparatus 200 in step S104. The server 100 transmits the public key of the server 100 to the information processing apparatus 200 together with a server certificate in step S105. The information processing apparatus 200 sets a common key and encrypts the common key by using the public key acquired from the server 100. The information processing apparatus 200 then transmits the encrypted common key to the server 100. The server 100 decrypts the encrypted common key by using a secret key that is held by only the server 100. Therefore, the server 100 and information processing apparatus 200 hold the common key that is not known to a third party.

In step S106, the information processing apparatus 200 then notifies the user terminal that the server 100 and information processing apparatus 200 have been successfully coupled to each other. In step S107, the information processing apparatus 200 establishes two-way communication in which information to be transmitted and received between the server 100 and the information processing apparatus 200 is encrypted by the common key held by the server 100 and information processing apparatus 200. This process enables the server 100 to transmit encrypted information to the information processing apparatus 200 without being blocked by security software, such as a firewall, installed in the information processing apparatus 200. In step S108, the server 100 notifies the information processing apparatus 200 that the two-way communication has been established.

1-3. Colorimetric Method

Figure 3:
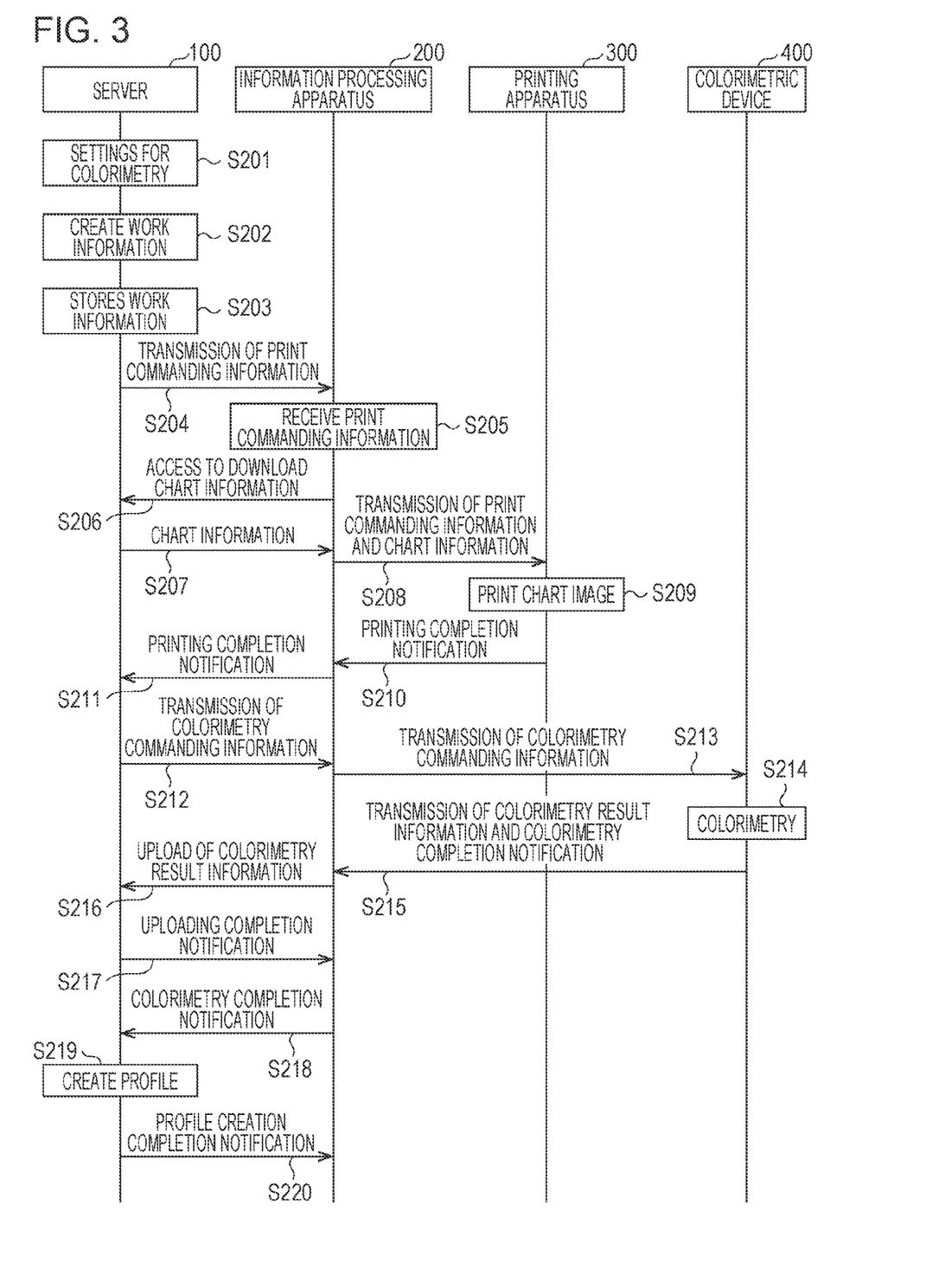
FIG. 3 illustrates a colorimetric method according to the embodiment.

FIG. 3 illustrates the colorimetric method according to this embodiment. The colorimetric method is executed by using the colorimetric system 10 described above. In the colorimetric system 10, the server 100 first makes settings for colorimetry in step S201, as illustrated in FIG. 3. These settings are made when information required to create work information DJ is accepted by the first processing portion 111. The information is entered from the information processing apparatus 200 into the server 100 according to, for example, a manipulation by the user on the input device 230. At that time, a graphic user interface (GUI) image that assists the entry, for example, is displayed on the display device 240.

In this embodiment, the information required to create work information DJ includes, for example, information related to settings in colorimetry by the colorimetric device 400 and information related to the target in colorimetry. Information related to settings in colorimetry by the colorimetric device 400 is, for example, setting information related to an M factor, a light source, the number of targets in colorimetry, and the number of times colorimetry is repeated. Information related to the target in colorimetry is, for example, information related to the type of the print medium. In this embodiment, when information required to create work information DJ has been entered, a job ID is created by the first processing portion 111 as an identifier that identifies the work information DJ.

Next, the server 100 creates work information DJ in step S202. Specifically, the first processing portion 111 creates work information DJ according to the information entered in step S201 described above. The work information DJ created in step S202 includes information related to the job ID described above so that the work information DJ can be distinguished from other pieces of work information DJ. A job ID is created for each piece of work information DJ to be created. The server 100 stores the work information DJ in the first storage device 120 with a correspondence between information related to the job ID included in the print commanding information and information related to the job ID included in the colorimetry commanding information. Besides the information related to the job ID, the work information DJ in this embodiment also includes information related to a one-time uniform resource locator (URL) used when chart information DG is to be downloaded and information related to a one-time URL used when colorimetry result information is to be uploaded. After the work information DJ has been created, an image representing, for example, the progress status of colorimetry based on work information DJ is displayed on the display device 240.

The information related to a one-time URL used when chart information DG is to be downloaded is an example of acquired-from information. The information related to a one-time URL used when colorimetry result information is to be uploaded is an example of upload information. In the description below, the information related to a one-time URL used when chart information DG is to be downloaded will be referred to as the download URL information, and the information related to a one-time URL used when colorimetry result information is to be uploaded will be referred to as the upload URL information.

The server 100 stores the work information DJ in the first storage device 120 in step S203. The server 100 then transmits the print commanding information included in the work information DJ from the first communication device 150 in step S204. The print commanding information includes download URL information and information related to the job ID. When the server 100 executes step S203, step S208 described later is executed by the information processing apparatus 200.

Next, the information processing apparatus 200 receives the print commanding information at the second communication device 250 in step S205. In step S206, the information processing apparatus 200 accesses the server 100 according to the download URL information in step S206, and then downloads chart information DG from the server 100. Upon successful downloading, the information processing apparatus 200 acquires the chart information DG from the server 100 in step S207.

Next, the information processing apparatus 200 transmits the print commanding information and chart information DG to the printing apparatus 300 in step S208. In step S208, the server 100 causes the information processing apparatus 200 to command, according to the print commanding information, the printing apparatus 300 to print a chart image. In step S209, the printing apparatus 300 prints a chart image based on the chart information DG, according to the print commanding information acquired from the information processing apparatus 200.

In step S210, the printing apparatus 300 transmits, to the information processing apparatus 200, a completion notification indicating that the printing has been completed. In step S211, the information processing apparatus 200 transmits the completion notification to the server 100 in correspondence to the job ID and a work result. The work result indicates, for example, that a chart image has been successfully or unsuccessfully printed on the print medium. Steps S205 to S208 and S211 described above are executed under control of the second processing portion 211.

Next, the server 100 transmits colorimetry commanding information included in the work information DJ from the first communication device 150 in step S212. The colorimetry commanding information includes upload URL information and information related to the job ID. The information processing apparatus 200 receives the colorimetry commanding information transmitted from the first communication device 150 at the second communication device 250. At that time, a work command for colorimetry based on the colorimetry commanding information or an image indicating a work operation in the colorimetry is displayed on the display device 240.

Next, the information processing apparatus 200 transmits the colorimetry commanding information to the colorimetric device 400 in step S213. In step S214, the person in charge of the colorimetric device 400 performs colorimetry for the chart image printed in step S209 described above, according to the colorimetry commanding information received from the information processing apparatus 200. In the colorimetry performed by the person in charge of the colorimetric device 400, colorimetry settings based on the colorimetry commanding information are used. The colorimetric device 400 reads image information related to the job ID added to the chart image. Colorimetry result information, which includes information related to the job ID, is obtained as a result of this colorimetry.

In step S215, the colorimetric device 400 transmits, to the information processing apparatus 200, the colorimetry result information and a completion notification indicating that the colorimetry has been completed. The colorimetry result information transmitted from the colorimetric device 400 is received at the second communication device 250 in the information processing apparatus 200 and is then acquired by the third processing portion 212. In the server 100, the colorimetry result information is stored in the second storage device 220 as necessary.

Next, in step S216, the information processing apparatus 200 accesses the server 100 according to the upload URL information and uploads the colorimetry result information to the server 100. In step S217, the server 100 transmits, to the information processing apparatus 200, a completion notification indicating that the upload has been completed. In step S218, the information processing apparatus 200 transmits, to the server 100, a completion notification indicating that the colorimetry for the chart image has been completed, in correspondence to the job ID and a work result. The work result indicates, for example, that colorimetry for the chart image has been successfully or unsuccessfully performed. Steps S213, S216, and S218 described above are executed under control of the third processing portion 212.

In step S219, the server 100 creates a profile DP according to the colorimetry result information uploaded from the information processing apparatus 200. In the creation of the profile DP, the profile creation portion 112 uses a known method. The profile DP may include the same job ID as the job ID added to the print commanding information and colorimetry commanding information, which are transmitted and received among portions in the colorimetric system 10 before the profile DP is created. After that, in step S220, the server 100 transmits, to the information processing apparatus 200, a completion notification indicating that the profile DP has been created.

As described above, the server 100 in the colorimetric system 10 executes the colorimetric method including steps S202, S203, S204, S208, S212, and S216 described above. In step S202, as described above, the server 100 creates work information DJ that includes print commanding information related to a command to print a chart image based on chart information DG and also includes colorimetry commanding information related to a command to perform colorimetry for the chart image. In step S203, the server 100 stores the work information DJ. In step S204, the server 100 transmits the pint commanding information to the information processing apparatus 200. In step S208, the server 100 causes the information processing apparatus 200 to command, according to the print commanding information, the printing apparatus 300 to print a chart image. In step S212, the server 100 transmits colorimetry commanding information to the information processing apparatus 200. In step S216, the server 100 acquires colorimetry result information created as a result of the colorimetry performed for the chart image by the colorimetric device 400.

The colorimetric system 10 has the server 100, information processing apparatus 200, colorimetric device 400, and printing apparatus 300 as described above. The server 100 has: the first processing portion 111, which is an example of a processing portion that creates work information DJ that includes print commanding information related to a command to print a chart image based on chart information DG and also includes colorimetry commanding information related to a command to perform colorimetry for the chart image; the first storage device 120, which is an example of a storage portion that stores work information DJ and a chart image; and the first communication device 150, which is an example of a communication portion and a first communication portion that transmit print commanding information to the information processing apparatus 200. The information processing apparatus 200 has: the second communication device 250, which is an example of a second communication portion that receives print commanding information from the server 100, the second processing portion 211 that causes the printing apparatus 300 to print a chart image; and the third processing portion 212 that acquires, from the colorimetric device 400, colorimetry result information created as a result of the colorimetry performed for the chart image by the colorimetric device 400.

In the colorimetric system 10 described above, work information DJ includes print commanding information and colorimetry commanding information separately, the print commanding information being transmitted from the server 100 to the information processing apparatus 200. Therefore, the information processing apparatus 200 can cause the printing apparatus 300 to print a chart image independently of actual measurement work in the colorimetric device 400. The result of this printing can be supplied in colorimetry, which is performed in the colorimetric device 400 according to the colorimetry commanding information. Furthermore, the server 100 or information processing apparatus 200 can acquire the result of this colorimetry as colorimetry result information. Therefore, it is possible to enhance the degree of freedom in work time taken by the user in colorimetry. In addition, the user does not need to be familiar with all work required in colorimetry. As understood from the above description, the colorimetric system 10 is superior in usability when compared with the colorimetric method in related art, which requires the user to be familiar with colorimetry.

The print commanding information includes acquired-from information related to the destination from which to acquire chart information DG. The information processing apparatus 200 acquires chart information DG according to the acquired-from information. The acquired-from information is smaller in data size than chart information DG. Therefore, the server 100 can more quickly transmit print commanding information, which includes acquired-from information, to the information processing apparatus 200 than when the server 100 transmits print commanding information, which includes chart information DG, to the information processing apparatus 200.

When the server 100 receives, from the information processing apparatus 200, a notification indicating that the chart image has been printed, the server 100 transmits colorimetry commanding information to the information processing apparatus 200. Then, the information processing apparatus 200 acquires, from the colorimetric device 400, colorimetry result information created as a result of the colorimetry, which is performed by the colorimetric device 400 according to the colorimetry commanding information. Therefore, even when the information processing apparatus 200 is disposed in a place where the colorimetric device 400 is not disposed, the information processing apparatus 200 can acquire colorimetry result information. This enhances the degree of freedom in a work place where colorimetry is performed.

The colorimetry commanding information includes upload information related to the destination to which to upload colorimetry result information. This enables the information processing apparatus 200 to upload colorimetry result information according to the information about the upload destination.

After the server 100 has transmitted the colorimetry commanding information to the information processing apparatus 200, the server 100 receives, from the information processing apparatus 200, a notification indicating that the colorimetry for the chart image has been completed. Therefore, the server 100 can confirm that colorimetry commanded by the server 100 itself has been completed, and can thereby execute processes eligible after colorimetry for the chart image has been performed.

The information processing apparatus 200 uploads colorimetry result information to the update destination according to upload information. The server 100 further has the profile creation portion 112 that acquires the colorimetry result information uploaded to the upload destination and creates a profile DP. The profile creation portion 112 transmits, to the information processing apparatus 200, a notification indicting that the profile DP has been created. This enables the information processing apparatus 200 to confirm that the profile DP has been created.

The work information DJ includes information related to a job ID used to identify the work information DJ. The server 100 makes a correspondence between print commanding information and colorimetry commanding information according to the information related to the job ID. Therefore, the server 100 can use the job ID to manage processes eligible before the creation of the profile DP, for example. This can prevent different work operations from being present in the creation of the profile DP. For example, the job ID can be used to make a correspondence between print commanding information and colorimetry commanding information about the same chart image. Furthermore, when the server 100 creates profiles DP in correspondence to a plurality of chart images, the created profiles DP can be appropriately managed by job IDs.

Chart information DG includes image information related to a job ID, which is an example of an identifier. In printing of a plurality of chart images, therefore, each of the plurality of chart images can be identified. This can prevent the wrong chart image from being selected.

2. Variations

The aspects exemplified above can be varied in various ways. Aspects of specific variations that can be applied to the aspects described above will be exemplified below. Any two or more aspects selected from the exemplary examples described below can be appropriately combined within a range in which any mutual contradiction does not occur.

2-1. Variation 1

Figure 4:
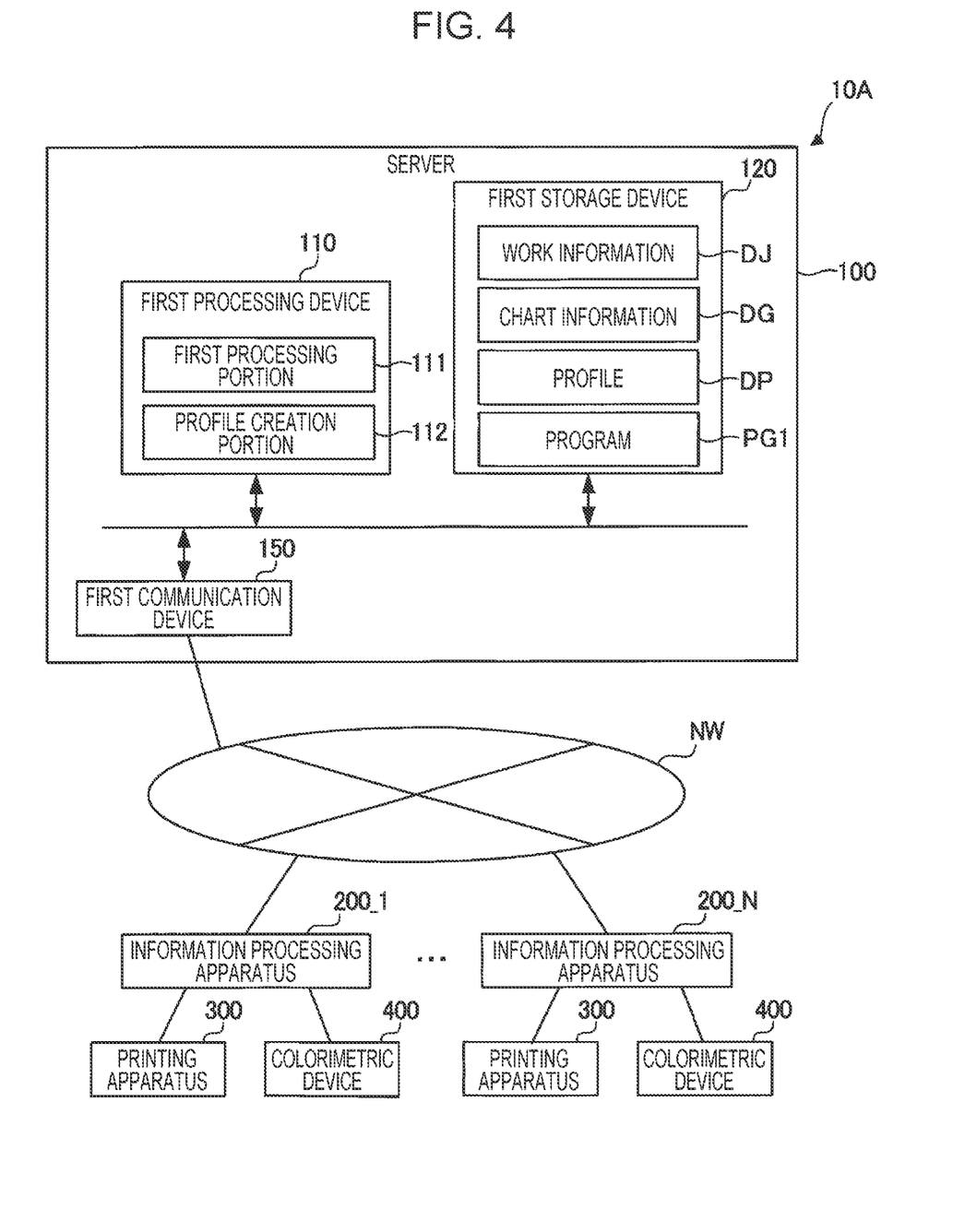
FIG. 4 illustrates an example of the structure of a colorimetric system in a variation.

FIG. 4 illustrates an example of the structure of a colorimetric system 10A in variation 1. The colorimetric system 10A is similar to the colorimetric system 10 in the embodiment described above except that the colorimetric system 10A has a plurality of information processing apparatuses 200 coupled to the server 100 so that communication is possible and that one combination of the printing apparatus 300 and colorimetric device 400 is coupled to each of the plurality of information processing apparatuses 200_1 to 200_N. In the structure in FIG. 4, N information processing apparatuses 200_1 to 200_N are coupled to a single server 100 through the network NW. Each of the information processing apparatuses 200_1 to 200_N is the information processing apparatus 200. The network NW is, for example, a LAN or the Internet. The number N is a natural number more than or equal to 2.

In variation 1 described above as well, it is possible to perform colorimetry with better usability than in related art. Among the colorimetric devices 400 coupled to the plurality of information processing apparatuses 200_1 to 200_N in the colorimetric system 10A in variation 1, a colorimetric device 400 suitable for colorimetry based on colorimetry commanding information can be selectively used. This is advantageous in that it is easy to enhance the quality of colorimetry based on colorimetry commanding information.

2-2. Variation 2

In the embodiment described above, the second communication device 250 in the information processing apparatus 200 has been coupled to the printing apparatus 300 and colorimetric device 400. However, this is not a limitation. The first communication device 150 in the server 100 may be wirelessly coupled to the printing apparatus 300 and colorimetric device 400 by, for example, Wi-Fi or Bluetooth. Alternatively, the first communication device 150 may be coupled to the printing apparatus 300 and colorimetric device 400 through, for example, a LAN or the Internet. When the first communication device 150 is coupled to the printing apparatus 300 and colorimetric device 400, the server 100 may transmit print commanding information and chart information DG to the printing apparatus 300 and may also transmit colorimetry commanding information to the colorimetric device 400. Furthermore, the colorimetric device 400 may transmit colorimetry result information to the server 100.

2-3. Variation 3

Figure 5:
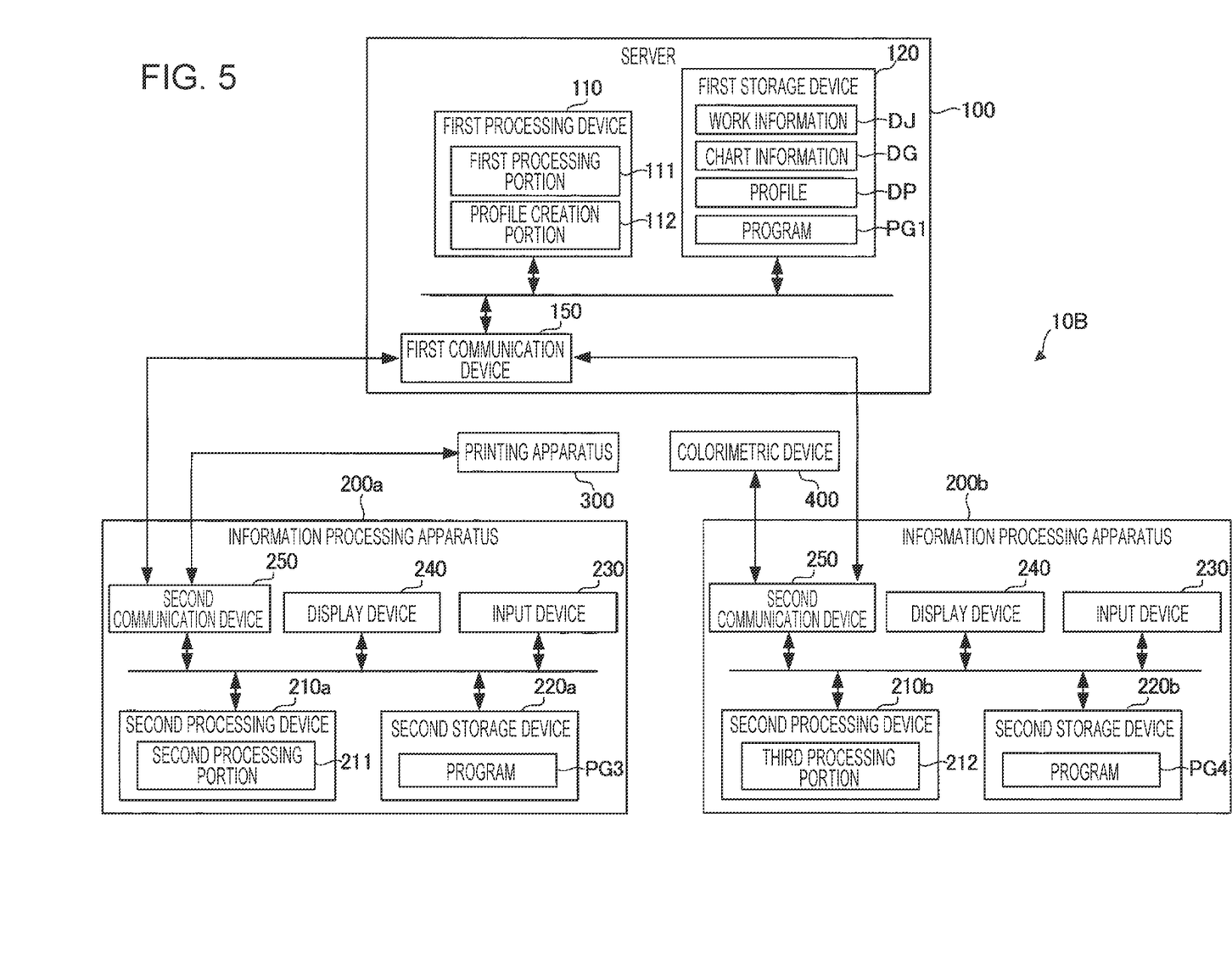
FIG. 5 illustrates an example of the structure of a colorimetric system in another variation.

FIG. 5 illustrates an example of the structure of a colorimetric system 10B in variation 3. The colorimetric system 10B is similar to the colorimetric system 10 in the embodiment described above except that the colorimetric system 10B has an information processing apparatus 200a and an information processing apparatus 200b instead of the information processing apparatus 200. In the description below, constituent elements similar to those in the colorimetric system 10 will be denoted by identical reference characters and their descriptions will be omitted.

The information processing apparatus 200a has a second processing device 210a and a second storage device 220a, as illustrated in FIG. 5. The second processing device 210a has a function that controls individual portions in the information processing apparatus 200a and also has a function that processes various types of data. The second processing device 210a includes a processor such as, for example, a CPU. The second processing device 210a may be composed of a single processor or a plurality of processors. Part or all of the functions of the second processing device 210a may be implemented by hardware such as a DSP, an ASIC, a PLD, or an FPGA.

The second storage device 220a stores a program PG3 to be executed by the second processing device 210a, and also stores various types of data to be processed by the second processing device 210a. The second storage device 220a includes, for example, a hard disk drive or a semiconductor memory. Part or the whole of the second storage device 220a may be disposed in an external storage device of the information processing apparatus 200a, a terminal apparatus, or the like.

In the information processing apparatus 200a described above, the second processing device 210a reads the program PG3 from the second storage device 220a and executes the program PG3. Due to this execution, the second processing device 210a functions as the second processing portion 211. Specifically, the second processing portion 211 causes the second communication device 250 in the information processing apparatus 200a to execute processing to accept print commanding information from the server 100 and then transmit the print commanding information to the printing apparatus 300.

The information processing apparatus 200b has a second processing device 210b and a second storage device 220b, as illustrated in FIG. 5. The second processing device 210b has a function that controls individual portions in the information processing apparatus 200b and also has a function that processes various types of data. The second processing device 210b includes a processor such as, for example, a CPU. The second processing device 210b may be composed of a single processor or a plurality of processors. Part or all of the functions of the second processing device 210b may be implemented by hardware such as a DSP, an ASIC, a PLD, or an FPGA.

The second storage device 220b stores a program PG4 to be executed by the second processing device 210b, and also stores various types of data to be processed by the second processing device 210b. The second storage device 220b includes, for example, a hard disk drive or a semiconductor memory. Part or the whole of the second storage device 220b may be disposed in an external storage device of the information processing apparatus 200b, a terminal apparatus, or the like.

In the information processing apparatus 200b described above, the second processing device 210b reads the program PG4 from the second storage device 220b and executes the program PG4. Due to this execution, the second processing device 210b functions as the third processing portion 212. Specifically, the third processing portion 212 causes the second communication device 250 in the information processing apparatus 200b to execute processing to accept colorimetry commanding information from the server 100 and then transmit the colorimetry commanding information to the colorimetric device 400. In variation 3 described above as well, it is possible to perform colorimetry with better usability than in related art.

2-4. Variation 4

In the embodiment described above, the information processing apparatus 200 has accessed the server 100 according to download URL information and has downloaded chart information DG from the server 100. However, this is not a limitation. For example, the information processing apparatus 200 may access a computer other than the server 100 according to down URL information and then may acquire chart information DG from the computer.

2-5. Variation 5

In the embodiment described above, the information processing apparatus 200 has accessed the server 100 according to upload URL information and has uploaded colorimetry result information to the server 100. The server 100 has created a profile DP according to the colorimetry result information. In the embodiment described above, however, colorimetry result information may be uploaded to a computer other than the server 100. In this case, the server 100 may acquire, from the computer, the colorimetry result information uploaded to the computer, and then may create a profile DP according to the acquired colorimetry result information.

What is claimed is:

1. A colorimetric method executed by a server that communicates with an information processing apparatus, the information processing apparatus coupled to a printing apparatus and to a colorimetric device, the method comprising:

creating work information that includes print commanding information that includes a print command and a colorimetry commanding information that includes a colorimetry command, the print command being structured such that, when interpreted and executed by the printing apparatus, the printing apparatus is caused to print a chart image based on chart information, the colorimetry command being structured such that, when executed by the colorimetric device, the colorimetric device is caused to perform colorimetry for the chart image;

storing the work information;

transmitting the print commanding information to the information processing apparatus;

causing the information processing apparatus to command, according to the print commanding information, the printing apparatus to print the chart image;

receiving a completion notification indicating that the priting the chart image has been completed from the information processing apparatus; and transmitting the colorimetry commanding information to the information processing apparatus after receiving the completion notification.

2. A colorimetric system comprising:
a server;
an information processing apparatus;
a colorimetric device; and
a printing apparatus, wherein
the server has
a first processing portion that creates work information that includes print commanding information that includes a print command and a colorimetry commanding information that includes a colorimetry command, the print command being structured such that, when interpreted and executed by the printing apparatus, the printing apparatus is caused to print a chart image based on chart information, the colorimetry command being structured such that, when executed by the colorimetric device, the colorimetric device is caused to perform colorimetry for the chart image,
a storage portion that stores the work information, and
a first communication portion that transmits the print commanding information to the information processing apparatus, and
the information processing apparatus has
a second communication portion that receives the print commanding information from the server,
a second processing portion that causes, according to the print command, the printing apparatus to print the chart image, and
a third processing portion that acquires, from the colorimetric device, colorimetry result information created as a result of the colorimetry performed for the chart image by the colorimetric device in response to executing the colorimetry command, wherein:
when the server receives, from the information processing apparatus, a completion notification indicating that the chart image was printed, the server transmits the colorimetry commanding information to the information processing apparatus.

3. The colorimetric system according to claim 2, wherein:
the print commanding information includes acquired-from information related to a destination from which to acquire the chart information; and
the information processing apparatus acquires the chart information according to the acquired-from information.

4. The colorimetric system according to claim 2, wherein the colorimetry commanding information includes upload information related to a destination to which to upload the colorimetry result information.

5. The colorimetric system according to claim 4, wherein after the server transmitted the colorimetry commanding information to the information processing apparatus, the server receives, from the information processing apparatus, a notification indicating that the colorimetry for the chart image was completed.

6. The colorimetric system according to claim 4, wherein:
the information processing apparatus uploads the colorimetry result information to the update destination according to the upload information;
the server further has a profile creation portion that acquires the colorimetry result information uploaded to the upload destination and creates a profile; and
the profile creation portion transmits, to the information processing apparatus, a notification indicting that the profile was created.

7. The colorimetric system according to claim 2, wherein:
the work information includes information related to an identifier used to identify the work information; and
the server makes a correspondence between the print commanding information and the colorimetry commanding information according to the information related to the identifier.

8. The colorimetric system according to claim 7, wherein the chart information includes image information related to the identifier.

9. The colorimetric system according to claim 8, wherein the image information is code information.

10. A server that communicates with an information processing apparatus, the server comprising:
a processing portion that creates work information that includes print commanding information that includes a print command and a colorimetry commanding information that includes a colorimetry command, the print command being structured such that, when interpreted and executed by a printing apparatus, the printing apparatus is caused to print a chart image based on chart information, the colorimetry command being structured such that, when executed a the colorimetric device, the colorimetric device is caused to perform colorimetry for the chart image;
a storage portion that stores the work information; and
a communication portion that transmits the print commanding information and the colorimetry commanding information to the information processing apparatus at different times wherein
when the server receives, from the information processing apparatus, a competition notification indicating that the chart image was printed, the server transmits the colorimetry commanding information to the information processing apparatus.

* * * * *